(12) United States Patent
Gessner

(10) Patent No.: US 6,533,161 B1
(45) Date of Patent: Mar. 18, 2003

(54) PROCESS FOR PRODUCING A GAS-TIGHT SOLDERED JOINT AND USE OF THE PROCESS IN THE PRODUCTION OF COMPONENTS WITH A VACUUM-TIGHT CASING

(75) Inventor: Klaus Gessner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/535,284

(22) PCT Filed: Jun. 10, 1994

(86) PCT No.: PCT/DE94/00686

§ 371 (c)(1),
(2), (4) Date: May 2, 1996

(87) PCT Pub. No.: WO95/00459

PCT Pub. Date: Jan. 5, 1995

(30) Foreign Application Priority Data

Jun. 18, 1993 (DE) .......................................... 43 20 910

(51) Int. Cl.⁷ .............................. B23K 31/02; C25D 3/46
(52) U.S. Cl. .................... 228/122.1; 228/254; 205/263
(58) Field of Search ........................... 228/122.1, 123.1, 228/124.1, 124.5, 124.6, 245, 254, 256; 205/263

(56) References Cited

U.S. PATENT DOCUMENTS

| | | | | |
|---|---|---|---|---|
| 3,793,705 A | * | 2/1974 | Cole et al. ................ | 228/124.1 |
| 3,994,430 A | * | 11/1976 | Cusano et al. ............ | 228/122.1 |
| 4,084,314 A | * | 4/1978 | Chakrabarty et al. ....... | 174/257 |
| 4,610,934 A | * | 9/1986 | Boecker et al. .......... | 228/122.1 |
| 4,729,504 A | * | 3/1988 | Edamura ................. | 228/122.1 |
| 4,795,866 A | * | 1/1989 | Hoene et al. ............. | 218/134 |
| 4,807,796 A | * | 2/1989 | Liehr ......................... | 228/121 |
| 4,871,108 A | * | 10/1989 | Boecker et al. ............ | 205/157 |
| 4,988,034 A | * | 1/1991 | Taniguchi et al. ........ | 228/122.1 |
| 4,996,111 A | * | 2/1991 | Do-Thoi et al. ............. | 428/432 |
| 5,023,147 A | * | 6/1991 | Nakata et al. ............... | 428/627 |
| 5,156,322 A | * | 10/1992 | Do-Thoi et al. ......... | 228/124.1 |
| 5,164,246 A | * | 11/1992 | Tanaka et al. .............. | 427/123 |
| 5,251,803 A | * | 10/1993 | Kashiba et al. .......... | 228/124.5 |
| 5,390,843 A | * | 2/1995 | Ito et al. ................... | 228/122.1 |
| 6,354,484 B1 | * | 3/2002 | Sakuraba et al. ........ | 228/122.1 |
| 6,399,019 B1 | * | 6/2002 | Sakuraba et al. ........ | 228/122.1 |

FOREIGN PATENT DOCUMENTS

| | | | |
|---|---|---|---|
| DE | 1 045 305 | | 11/1958 |
| DE | 26 45 953 | | 4/1978 |
| DE | 31 15 494 | | 11/1982 |
| DE | 38 24 900 | | 1/1990 |
| DE | 3824900 A1 | * | 1/1990 |
| DE | 41 11 189 | | 9/1992 |
| DE | WO 95/00459 | * | 6/1994 |
| EP | 0 040 933 | | 12/1981 |
| EP | 0 277 909 | | 8/1988 |
| JP | 02038378 A | * | 2/1990 |
| JP | 04168792 A | * | 6/1992 |
| JP | 404170374 A | * | 6/1992 |
| JP | 404187577 A | * | 7/1992 |

OTHER PUBLICATIONS

Handbuch der Vakuumelektronik, R. Oldenbourg Verlag, München–Wien, 1989, pp. 20–22, Josef Eichmeier et al.

* cited by examiner

*Primary Examiner*—Tom Dunn
*Assistant Examiner*—Kiley Stoner
(74) *Attorney, Agent, or Firm*—Kenyon & Kenyon

(57) ABSTRACT

In order to simplify the soldering process in the production of a vacuum-tight soldered joint between a ceramic component and a copper component, a layer of silver is first applied galvanically to the copper component to form the soldering material together with the underlying surface layer of the copper component. During the heat treatment required for soldering metal components can also be soldered in the same manner to the copper component, e.g. the bellows or the screen of a vacuum switching tube.

4 Claims, 1 Drawing Sheet

PROCESS FOR PRODUCING A GAS-TIGHT SOLDERED JOINT AND USE OF THE PROCESS IN THE PRODUCTION OF COMPONENTS WITH A VACUUM-TIGHT CASING

The invention lies in the field of vacuum electronics and is to be used in the gas-tight soldering of a ceramic component to a copper component using a soldering material.

The production of gas-tight soldered joints between a ceramic component and a copper component is conventional, for example, in high-power tubes and vacuum switching tubes. For vacuum switching tubes, a soldering technique is known in which a cupped copper casing is butt soldered to a ceramic sheet, i.e., in which so-called cut soldering is performed. Here, the ceramic sheet is first metal-plated in the area where the soldered joint is to be placed. To produce the soldered joint, a soldering ring is put down in the transition area between the copper component and the ceramic component, which soldering ring melts during the heat treatment required for soldering, the soldering material joining the copper component and the ceramic component to one another in the area of their boundary surfaces (EP 0 040 933 B1, FIGS. 7 and 8). Here, it is conventional to use as the soldering material so-called copper-silver-eutectic solders which come in the form of a film or a wire ring ("Handbuch der Vakuumelektronik" [Handbook of Vacuum Electronics], Josef Eichmeier and Hinrich Heynisch, R. Oldenbourg-Verlag München/Wien, 1989, p. 22).

To produce a soldered joint between a ceramic component and a metallic component, e.g., to produce a gas-tight and adherent soldered joint in the production of a vacuum switching tube, a soldering technique is known in which a first layer made of silver and then a further layer made of copper are applied to the ceramic component following its metallization in the area where the soldered joint is to be placed. Following the connection of the components to be joined, a homogeneous copper/silver alloy forms under the soldering conditions which constitutes the actual soldering means. Moreover, especially for soldering a ceramic component to a copper sheet, it is provided to deposit silver alone on the metal-plated ceramic component using electroplating technology. When the components to be joined are heated to 961° C., an eutectic having a melting point of about 780° C. then forms in the area of the copper sheet (DE 38 24 900 A1). This soldering technique, in which in other words the surface layer of the copper component in the area of the connection point is drawn upon to form the actual solder, appears suitable only for butt soldered joints but not for cut soldered joints.

Starting with a process having the features of the generic part of patent claim 1 (DE 38 24 900 A1), the underlying object of the invention is to simplify and to improve the production of such a soldered joint by making available a larger quantity of soldering means.

To meet this objective, it is provided according to the invention that the copper component is provided galvanically with a silver layer in the area where the soldered joint is to be placed as well as in surface areas bordering the actual location where the soldered joint is to be placed prior to the heat treatment.

In a process of this sort, it is unnecessary to carry out a very often difficult alignment of the soldering material to the soldering location. By incorporating a larger surface layer of the copper component as a constituent of an eutectic alloy which does not arise until the soldering process, the handling of the soldering process, including the galvanic application of the silver layer, whose thickness can lie in the range from 2 to 100 $\mu$ depending on the soldering surface and the geometry of the copper component, is significantly simplified. Particularly with cut soldered joints, a sufficiently large quantity of soldering material is made available in this manner. In special application cases, it is thus possible to use the soldering process for joining the copper component to the ceramic component simultaneously for producing further soldered joints, in particular for joining the copper component to other metal components. In these cases, the copper component as a whole can have a silver layer. For example, in the production of vacuum switching tubes, i.e., of components having a vacuum-tight casing, the copper component, assuming it forms a casing cap or a casing flange, can be simultaneously soldered to the bellows and to a bearing seat for the introduction of the movable contact stud.

BRIEF DESCRIPTION OF DRAWINGS

Exemplary embodiments for the application of the new process are shown in FIGS. 1 to 4. The following are shown:

FIG. 1 shows in cutaway portions a vacuum switching tube, to whose casing a cylindrical casing component 1, the ring-shaped ceramic insulator 2 and the casing cap 3 belong. The contact stud 4 of the movable contact piece 5 is fed through the casing cap 3. A bellows 6 joins the contact stud 4 to the casing cap 3 in a vacuum-tight manner. Moreover, a bearing seat 7 is joined to the casing cap 3, which bearing seat 7 accommodates the bearing 8 for the contact stud 4.

The casing cap 3 is made of copper and is butt soldered on one side to the ceramic insulator 2. Moreover, it is butt soldered to one end of the bellows 6, which is made of steel, and is also soldered to the bearing seat 7, which is made of a copper alloy. In preparation for the soldering process, the ceramic insulator is provided on one side in the area of the soldering location with a metallization, not described further here; moreover, the casing cap 3 made of copper is provided completely with a galvanically applied silver layer which is about 20$\mu$ thick. At a soldering temperature of about 800° C., the silver layer forms an eutectic alloy with the surface layer of the casing cap 3, which alloy acts as the soldering material in the area of the different soldering locations. In this manner, the casing cap 3 is soldered to the ceramic insulator 2 as well as to one end of the bellows 6 and to the bearing seat 7 in a single operation.

Figure 1:
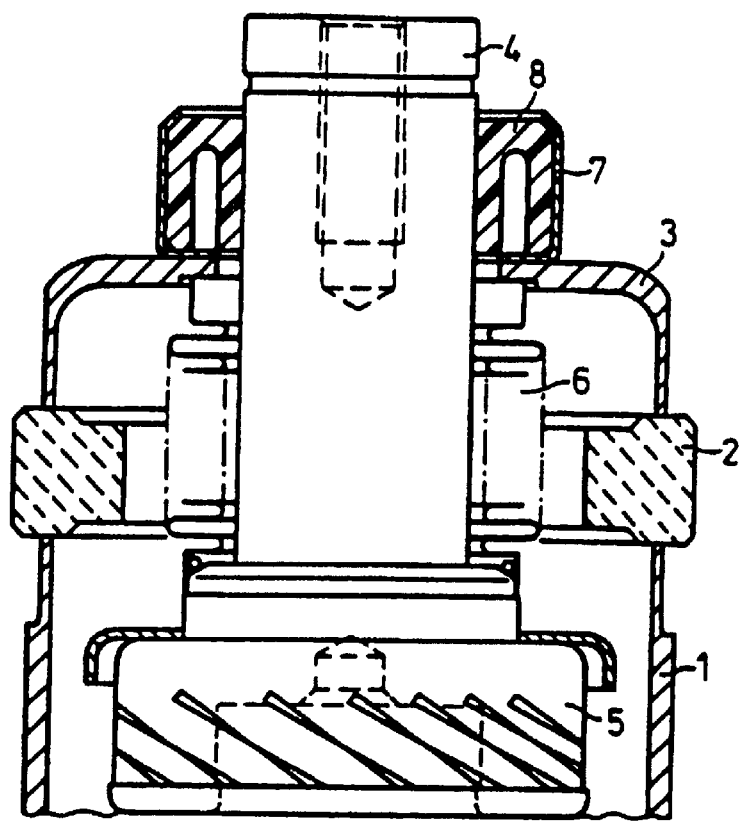
FIG. 1 A vacuum switching tube in cutaway portions in the area of the movable contact piece, FIGS. 2 and 3 Components to be soldered of a vacuum switching tube in schematic representation in the area of the introduction of the movable contact piece, FIG. 4 Metal components of a vacuum switching tube, likewise in schematic representation, which are to be joined either directly or indirectly to ceramic components.
Figure 2:
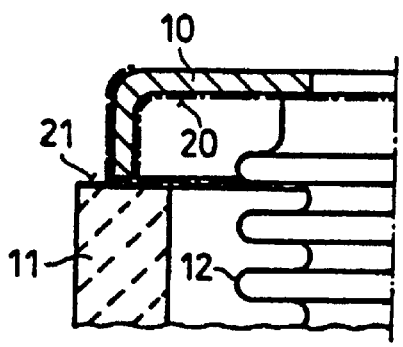
Figure 3:
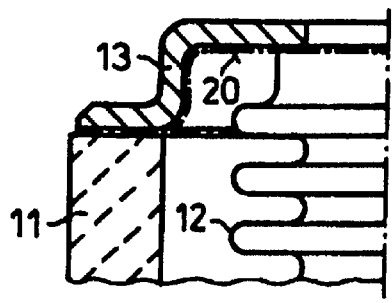

FIGS. 2 and 3 show different application cases before performing the soldering process. According to FIG. 2, a copper cap 10 is provided partially with a galvanically applied silver layer 20 shown as a dot-dash line. The copper cap 10 is set on the end face of a cylindrical ceramic insulator 11, which is provided with a metallization 21 in the area of its end face.

Moreover, a bellows 12 is arranged such that it abuts flushly upon the casing cap 10 with its one end designed as a cylindrical lug.

Figure 4:
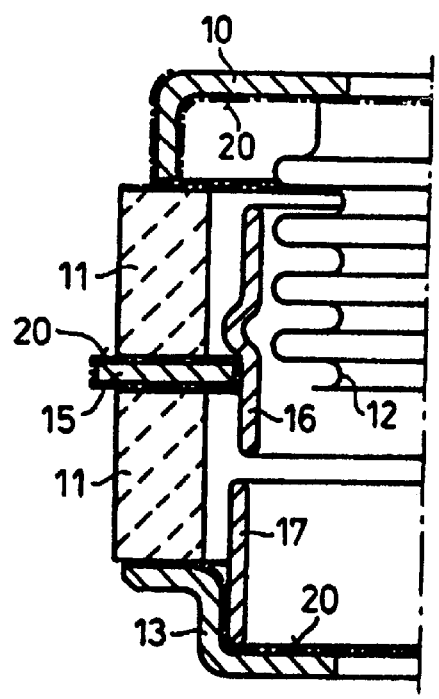

According to FIG. 3, a casing cap 13 made of copper, which bears a silver layer 20 essentially only on the inner surface, is joined flatly to the end face of the ceramic insulator 11. A bellows 12 is butt soldered to the copper cap According to FIG. 4, two ceramic insulators 11 and 14 are joined via an intermediate ring 15 to one another and also to the adjoining casing caps 10 and 13. The intermediate ring 15 is to be joined additionally to a screen 16 and the casing cap 13 additionally to the screen ring 17. Moreover, the joining of the bellows 12 to the casing cap 10 is intended. For this purpose, the casing caps 10 and 13 as well as the intermediate ring 15 are made of copper. The casing caps 10 and 13 are provided partially and the intermediate ring 15 fully with a galvanically applied silver layer 20. The screen 16 and the screen ring 17 are made likewise of copper, whereas the bellows 12 is made of high-grade steel, which can be provided in the area where the soldered joint is to be placed with a very thin layer of precious metal, particular a gold coating. For such a design of the casing or rather a vacuum switching tube, it is thus possible to produce seven soldered joints in a single operation without the use of special solder members.

What is claimed is:

1. A process for producing a gas-tight soldered joint between a ceramic component and a copper component, comprising the steps of:

a) applying metal-plating to the ceramic component in an area of the soldering location;

b) placing the copper component on the ceramic component;

c) joining the copper component to the ceramic component using a soldering material made of a copper-silver-eutectic through heat treatment; and d) applying galvanically to the copper component a silver layer in the area where the soldered joint is to be placed, as well as in surface areas bordering the actual location where the soldered joint is to be placed prior to the heat treatment.

2. The process according to claim 1, further comprising the steps of:

e) applying the silver layer also in such areas of the copper component where the copper component is to be soldered to other metal components; and f) performing the soldering of the copper component to the metal components simultaneously with the soldering of the copper component to the ceramic component.

3. A process for producing a gas-tight soldered joint between a ceramic component and a copper component, which has a vacuum-tight casing made of a copper component, said process comprising the steps of:

a) applying metal-plating to the ceramic component in an area of the soldering location;

b) placing the copper component on the ceramic component;

c) joining the copper component to the ceramic component using a soldering material made of a copper-silver-eutectic through heat treatment; and d) applying galvanically to the copper component a silver layer in the area where the soldered joint is to be placed, as well as in surface areas bordering the actual location where the soldered joint is to be placed prior to the heat treatment.

4. The process according to claim 3, further comprising the steps of:

e) applying the silver layer also in such areas of the copper component where the copper component is to be soldered to other metal components; and f) performing the soldering of the copper component to the metal components simultaneously with the soldering of the copper component to the ceramic component.

* * * * *